(12) United States Patent
Gleim

(10) Patent No.: US 6,286,649 B1
(45) Date of Patent: Sep. 11, 2001

(54) UNIDIRECTIONAL ROTARY DRIVE MECHANISM FOR MULTI-PART CONSTRUCTION TOY

(75) Inventor: Robert Gleim, Royersford, PA (US)

(73) Assignee: Connector Set Limited Partnership, Hatfield, PA (US)

( * ) Notice: Subject to any disclaimer, the term of this patent is extended or adjusted under 35 U.S.C. 154(b) by 0 days.

(21) Appl. No.: 09/492,997

(22) Filed: Jan. 27, 2000

(51) Int. Cl.[7] ........................................ F16P 11/16
(52) U.S. Cl. .................. 192/46; 192/107 T; 192/108
(58) Field of Search ........................ 446/103, 102; 192/46, 107 T, 108; 464/37

(56) References Cited

U.S. PATENT DOCUMENTS

| | | | |
|---|---|---|---|
| 3,589,486 | * 6/1971 | Kelch ...................................... | 192/46 |
| 3,928,862 | * 12/1975 | Ivester et al. ........................ | 192/46 X |
| 3,929,300 | 12/1975 | Lindqvist . | |
| 4,131,186 | 12/1978 | Marquis et al. ..................... | 192/67 R |
| 4,155,228 | 5/1979 | Burgener et al. ..................... | 68/133 |
| 4,401,006 | * 8/1983 | Sekiguchi ............................ | 192/46 X |
| 5,020,648 | * 6/1991 | Bush et al. ............................. | 192/46 |
| 5,088,581 | * 2/1992 | Duve ...................................... | 192/46 |
| 5,690,202 | 11/1997 | Myers ................................... | 192/46 |

FOREIGN PATENT DOCUMENTS

| | | |
|---|---|---|
| 1093347 | 11/1965 | (GB) . |
| 2021932 A | 5/1979 | (GB) . |
| 2142992 A | 6/1983 | (GB) . |
| 2151458 A | 11/1984 | (GB) . |
| WO 98/42996 | 10/1998 | (WO) . |

\* cited by examiner

*Primary Examiner*—Charles A Marmor
*Assistant Examiner*—Saúl Rodríguez
(74) *Attorney, Agent, or Firm*—Schweitzer Cornman Gross & Bondell LLP

(57) ABSTRACT

A unidirectional drive for a multi-part construction toy. A circular first drive element is received within the cylindrical wall of a second drive element. Each drive element has angularly oriented fixed drive teeth projecting toward the other. The outermost dimension of the first drive element is such as to enable it to rotate in one direction within the second drive element, without driving engagement to cause the second element to rotate. At least one of the drive elements is free to move radially with respect to its axis of rotation such that, when rotated in a driving direction, relative radial displacement between the two drive elements causes the respective drive teeth to become positively engaged for maintaining the two drive elements in positive driving relation. An extraordinarily simple and inexpensive one-way clutch drive is achieved.

7 Claims, 3 Drawing Sheets

UNIDIRECTIONAL ROTARY DRIVE MECHANISM FOR MULTI-PART CONSTRUCTION TOY

BACKGROUND AND SUMMARY OF THE INVENTION

The present invention is directed to a highly simplified and inexpensive unidirectional rotary drive mechanism suitable for use in connection with multi-part construction toys. The invention is particularly useful in connection with, but by no means limited to, construction toys sold under the trademark "K'NEX". Certain features of the K'NEX construction toy system are exemplified by U.S. Pat. No. 5,199,919, granted Apr. 6, 1993.

Unidirectional drive mechanisms are well known and thoroughly understood. The present invention is directed, not to the concept of unidirectional drives in the broad sense, but to a special design for such a mechanism enabling it to be inexpensively fabricated from molded plastic parts and easily assembled into a functioning unidirectional drive by a typical person utilizing the construction toy.

In one of its most basic form, the unidirectional drive of the invention comprises inner and outer drive elements arranged when one of the elements is rotated in a first direction to have driving engagement and, when that same driving element is rotated in the opposite direction, to be able to rotate freely without driving engagement with the other element. The inner driving element is generally circular and has outwardly projecting, angularly oriented driving teeth. The outer element, which surrounds the inner element, has inwardly projecting, angularly oriented driving teeth capable of driving engagement with the teeth of the inner element. The driving teeth are fixed in relation to the driving element on which they are formed, and at least one of the driving elements is freely displaceable in a direction radially of the rotational axis of the driving elements. When the elements are rotated in the non-driving direction, the displaceable driving element is bodily displaced to a position in which the respective driving teeth are free of effective engagement. However, when one of the elements is rotated in a driving direction, the displaceable element immediately is displaced radially, by gravity or otherwise, to a slightly eccentric position in which the respective driving teeth are fully engaged, and a positive driving effect is achieved.

In a preferred embodiment of the invention, both of the driving elements are mounted on a common construction rod, forming a shaft. One of the driving elements is mounted for free rotation on the rod while the other has driving engagement with the rod by means of a snap-on clip which is secured to the rod and as a loose rotational driving connection with the other driving element, which allows the latter to be displaced radially in the manner desired.

For a more complete understanding of the above and other features and advantages of the invention, reference should be made to the following detailed description of preferred embodiments of the invention and to the accompanying drawings.

IN THE DRAWINGS

DESCRIPTION OF PREFERRED EMBODIMENTS

Figures 1, 2:
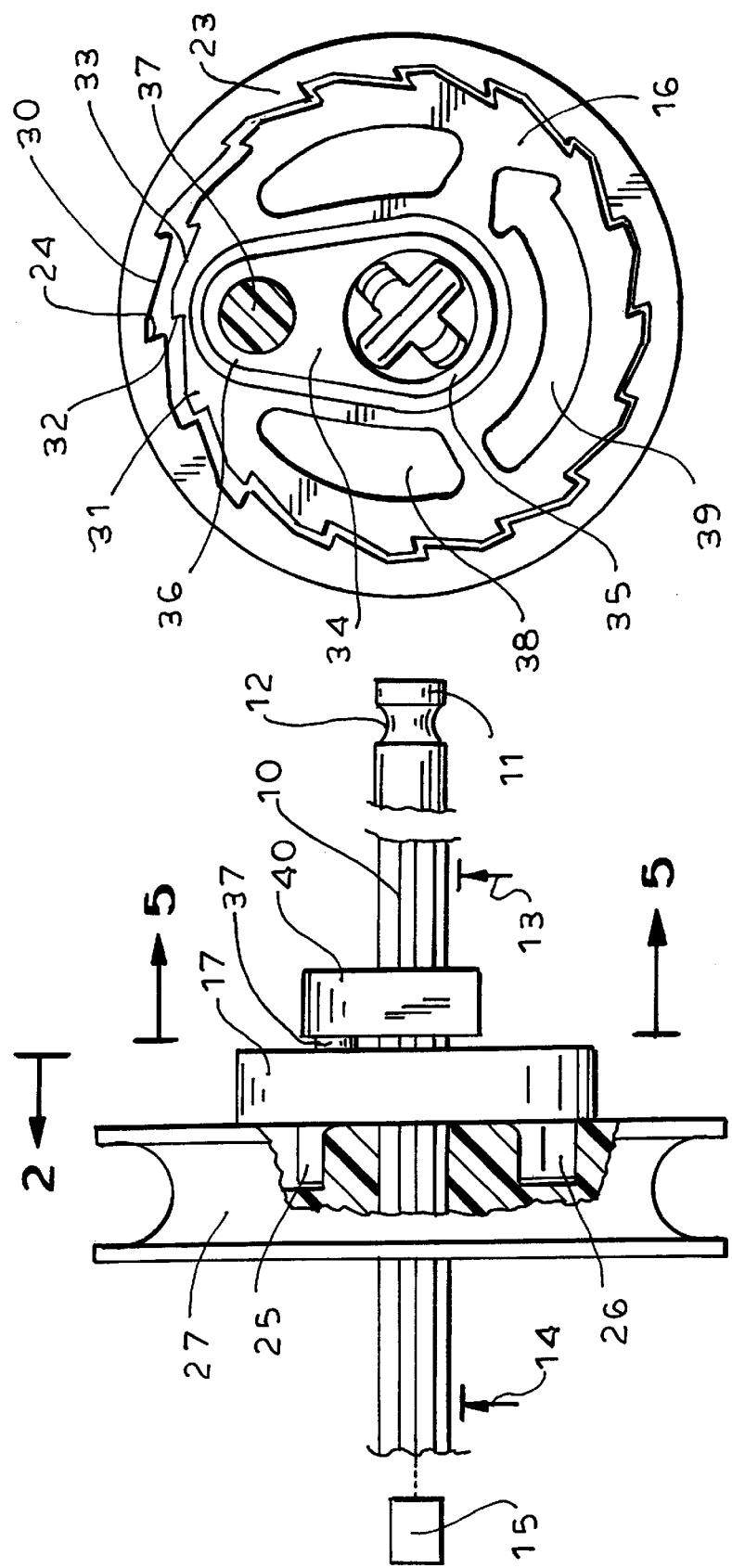
FIG. 1 is a side elevational view of a unidirectional rotary drive mechanism according to the invention, with parts broken away to illustrate details.
FIG. 2 is an enlarged cross sectional view, as taken generally on line 2—2 of FIG. 1, illustrating interengagement of the inner and outer drive elements.
Figure 4:
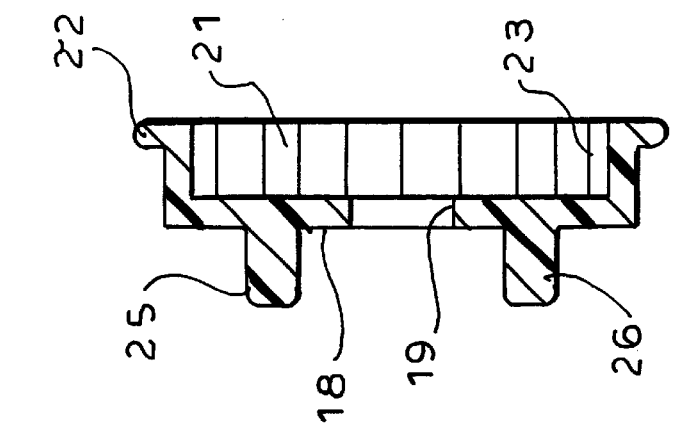
FIG. 4 is an enlarged cross sectional view of the outer drive element, as taken on line 4—4 of FIG. 3.
Figure 3:
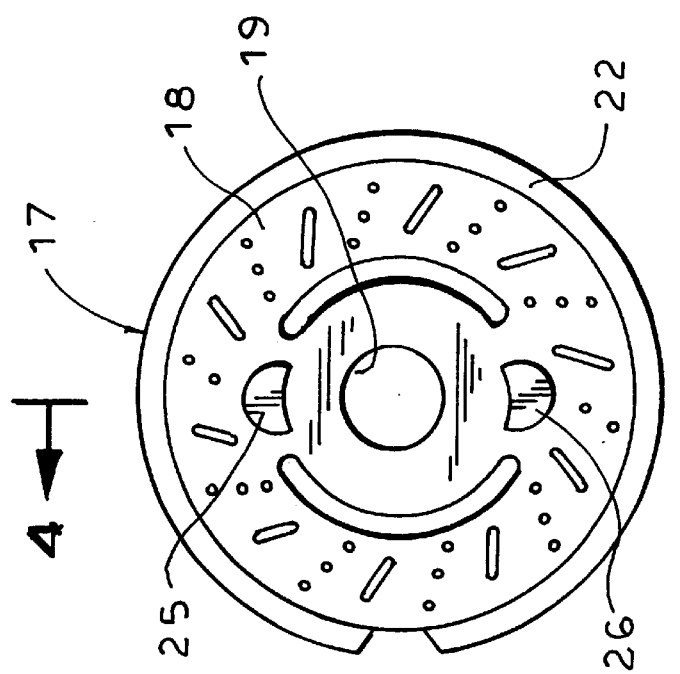
FIG. 3 is an elevational view of the closed end of the drive element.

Referring now to the drawing, and initially to FIGS. 1 and 2 thereof, the reference numeral 10 designates a typical rod element which forms a standard component of a K'NEX construction toy set. At each end, the rod is provided with an end flange 11 and an adjacent annular groove 12 which accommodates snap action assembly with connector elements of the construction toy set, as discussed in more detail in the Glickman U.S. Pat. No. 5,199,919 heretofore mentioned. Between the end extremities, the rod 10 typically has an X-shaped cross section, as indicated in FIG. 2 for example. The X-shaped section is accommodated within the same circular envelope as the end portion 11 of the rod, to enable various elements of the construction set to be applied over the end of the rod and to be supported on the rod either rotatably or in fixed relation to the rod, as may be desired.

In the illustrated arrangement, the rod 10 is intended to be rotationally supported, and this is indicated schematically by bearing supports 13, 14. The rod may be rotationally driven directly or indirectly by a drive means indicated schematically at 15.

The primary components of the unidirectional drive mechanism of the invention comprise an inner rotary drive element 16 and an outer drive element 17. As will be understood, either of these elements may be the driving element or the driven element, depending upon the particular arrangements of the drive system. For the purpose of this illustration, however, it is the inner driving element 16 that will be connected to the rod 10 and driven by the motor 15, and the outer drive element 17 rotates freely on the rod 10 and is driven (nor not) by the inner drive element 16, depending upon the direction of rotation, as will appear.

In the illustrated form of the invention, the outer drive element 17, which is preferably injection molded of a material such as Celcon, an acetal copolymer, made available by Hoechst Celanese, or similar structural plastic. The drive element 17 includes a circular back wall 18 provided with a center opening 19 of a diameter to fit closely over the rod 10, while being easily rotatable thereon. Integral with the circular back wall 18 is a cylindrical outer wall 20 which, together with the back wall 18, forms a central, generally cylindrical recess 21, which is open at the front of the drive element. A small stiffening flange 22 may advantageously be provided about the exterior periphery of the cylindrical wall 20, at its front edge.

In accordance with the invention, the cylindrical wall 20 is provided on its internal surface with a series of evenly spaced fixed driving teeth 23, which project inwardly and are angularly oriented in a clockwise direction, as viewed in FIG. 2. In a typical and advantageous toy device, in which the outer driving element 17 which may have an overall diameter of about 30 mm, for example, the driving element 17 may advantageously be provided with sixteen fixed driving teeth 23 which may have a depth of, for example, about 1.5 mm. To advantage, the driving faces 24 of the teeth are disposed at an angle to a radius from the center line of the drive element to form an undercut such that, when interacting with similarly configured teeth of the cooperating drive element 16, the engaged teeth will tend to become more fully engaged. In a preferred embodiment of the invention, an angle of 20° with respect to a radius line has been found to be useful. The back faces 30 of the teeth are inclined at a shallow angle to the rotational direction, as shown in the drawing.

Figure 7:
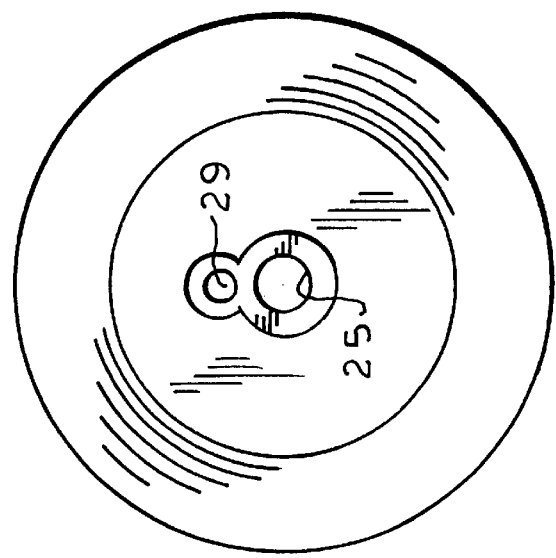
FIG. 7 is an elevational view of a drive output element illustrated in FIG. 1.

In the illustrated device, the outer drive element 17 is provided with one, and preferably a pair, of driving lugs 25, 26, which extend from the back wall 18 at a predetermined distance outward from the center of the element. The driving lugs are adapted for engagement with other elements of the construction toy system, such as wheels, pulleys, gears or structural elements. For example, in the illustration of FIG. 1, an element 27, which can function either as a pulley or as a wheel for mounting a tire (not shown), is drivingly engaged with the outer driving element 17. The element 27, shown also in FIG. 7, includes a central opening 28 of a size to closely receive the rod 10, and also a second opening 29, spaced radially outward from the central opening 28 and of a size to snugly receive one of the drive pins 25 or 26. When the element 27 is engaged with the outer drive element 17, as shown in FIG. 1, it is rotated thereby and, in the illustrated arrangement, provides for the output of the unidirectional drive mechanism. It will be understood, of course, that the element 27 may also serve as the rotational input to the drive mechanism, if desired.

The inner drive member 16, shown in FIG. 2, is a unitary molding of a suitable structural plastic material, such as nylon, and is provided with fixed, circumferentially spaced drive teeth 31 which project outwardly from the body of the drive element and are angularly oriented opposite to the drive teeth 23 of the outer drive member 17. The form of the drive teeth 31 corresponds to that of the drive teeth 23 in that the driving faces 32 of the teeth are undercut by, for example, an angle of 20°, and the back faces 33 are inclined at a shallow angle, in the manner of the back faces 30 of the outer drive teeth 23. The arrangement is such that, when the teeth are engaged in the "driving" direction (i.e. rotation of the inner driving element 16 in a counterclockwise direction as shown in FIG. 2) the respective driving teeth 23, 31 are effectively engaged. When the inner driving element 16 is rotated in the opposite (clockwise) direction, the respective driving teeth will slide against each other in non-driving contact.

Preferentially, the outermost diameter of the inner driving element 16 is just slightly less than the innermost diameter of the outer drive element 17. For example, in a typical and advantageous embodiment, in which the outermost diameter of the inner drive element 16 is 22.56 mm, the innermost diameter of the outer drive element may be 22.81 mm, providing a clearance of about 0.12 mm when the respective elements are concentrically positioned.

Pursuant to the invention, the unidirectional drive functionality is achieved in a device in which both the inner and outer drive elements are formed with fixed drive teeth, rather than flexible or movable drive teeth as is typical of unidirectional devices. In accordance with the present invention, at least one of the drive elements 16, 17 is arranged for easy movement in a direction at right angles to the axis of rotation in order to effect the desired engagement and disengagement of the drive teeth for unidirectional operation.

In the illustrated form of the invention, the inner drive element 16 is provided with an enlarged, elongated and eccentric central opening 34 comprised of a first portion 35 in the center area of the drive element, and a second portion 36 located radially outward from the center. The inner portion 35 is formed with a radius about the center of the drive element which is larger than the diameter of the rod 10 by an amount sufficient to accommodate radial displacement of the inner drive element 16 in any direction sufficient to enable the inner drive teeth 31 to engage effectively with the outer drive teeth 23.

In an advantageous practical embodiment of the invention, the central portion 35 of the opening 34 may have a radius of about 3.9 mm, when intended for use in conjunction with a rod of 6.4 mm diameter, providing for freedom of movement of the inner drive element 16 of about 0.7 mm in any direction off of center. At the opposite end of the eccentric opening 34, the offset portion 36 may have a radius of about 2.74 mm, for use in conjunction with a drive element 37, to be described in more detail, of about 2 mm radius, again providing for about 0.7 mm movement of the inner drive member 16 in any direction.

With respect to the individual portions 35, 36 of the eccentric opening 34, it will be understood that these portions may, if desired, be separate circular openings. However, for convenience and for weight reduction and material savings in the item, the eccentric opening, with an open section connecting the individual portions 35 and 36, is preferred. For purposes of weight reduction, the inner drive element 16 may also be provided with recesses 38, 39, the latter of which advantageously is in the form of an arrow indicating rotational direction.

Figure 5:
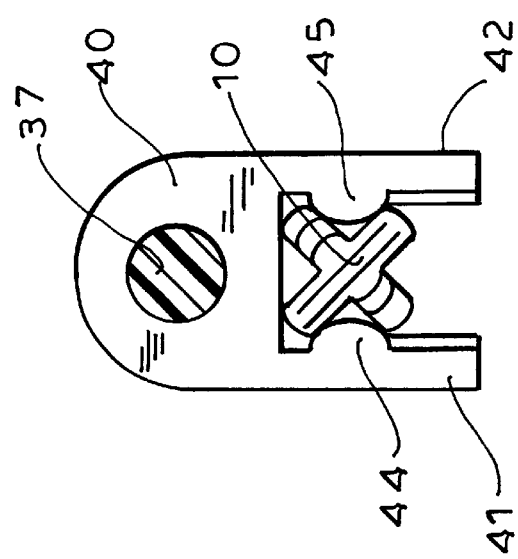
FIG. 5 is a cross sectional view as taken generally on line 5—5 of FIG. 1.
Figure 6:
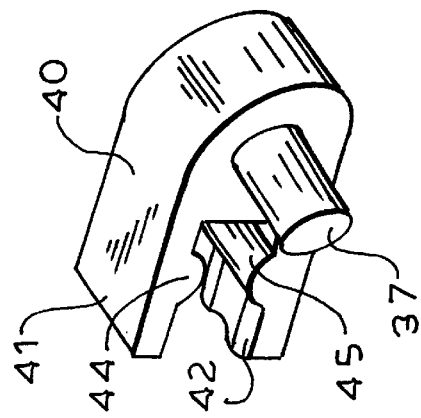
FIG. 6 is a perspective view of a clip element useful for providing a rotary driving connection between a rod and one of the drive elements.

For drivingly connecting the inner drive element 16 to the rod 10, it is convenient to utilize a clip element 40, which is an existing component of a standard K'NEX construction toy set. The clip device is shown in FIGS. 5 and 6 of the drawing and includes a pair of spaced apart gripping arms 41, 42 forming an open socket 43. Transverse projections 44, 45 are provided on the respective gripping arms 41, 42. This arrangement provides, among other things, for the crosswise reception of the X-shaped cross section of a rod 10 between the gripping arms 41, 42, with the transverse projections 44, 45 being tightly received between the longitudinal recesses of the rod formed by its X-shaped cross section. A driving lug 37 extends from one side of the clip device 40, in a direction parallel to the rod 10 engaged in the manner shown in FIG. 5. This driving lug has a diameter of approximately 2 mm, and is adapted to be received in the radially outer section 36 of the eccentric opening 34 in the drive element 16 as previously described. The clip element 40 is adapted to be snapped in place onto the rod 10 at any place along its length and then moved longitudinally therealong to a position in which the drive lug 37 engages with the drive element 16, in the opening 34 thereof. The output element 27 may be positioned by a similar or other type of clip device 47, arranged to prevent axial displacement of the output element 27, while accommodating free rotation of the latter on the rod 10.

In the operation of the device of the invention, it will be readily understood that rotation of the inner drive member 16 in a clockwise direction, as viewed in FIG. 2, cannot cause the outer drive member 17 to be driven, as the respective drive teeth 23, 31, if they have any contact at all, will merely slide relative to each other, over the sloped back faces 30, 33 of their drive teeth. In this respect, the inner drive element is freely movable in a radial direction with respect to the axis of the rod 10, so that, to the extent there is any sliding contact between the back faces 30, 33 of the drive teeth, the effect of that is simply to displace the inner drive member radially toward a position in which there is no contact. When the rod 10 is rotated in a counterclockwise direction, as viewed in FIG. 2, the drive lug 37 quickly engages a side wall of the eccentric opening 34 causing an eccentric displacement of the inner drive element sufficiently to effect engagement of drive teeth at some point along the circumference of the inner drive element. Indeed, in many cases, gravity alone will cause the inner drive element to drop into a position in which the teeth are engaged for driving, whenever the element is not being rotated in one direction or the other. However, it is not necessary to rely upon gravity to effect positive engagement of the driving teeth, which in any event occurs because of the eccentric engagement of the driving lug 37 with outer portions of the eccentric opening 34.

Figure 8:
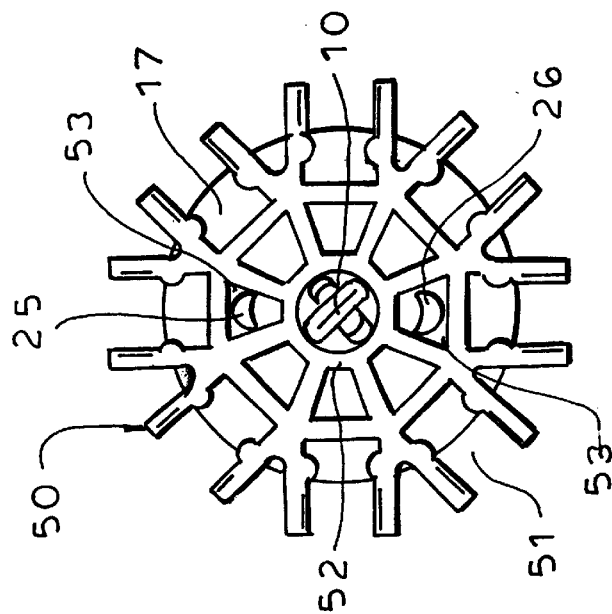
FIG. 8 is a cross sectional view illustrating the manner in which the drive mechanism of the invention may be coupled with a structural element of the construction toy set.

As will be understood, the element 27 may take a variety of forms, such as the pulley shown, a wheel (as the wheel of a vehicle), a gear or the like. In addition, the element 27 may take the form of a standard structural connector element of a K'NEX building set. Thus, as shown in FIG. 8, a connector element 50 having eight equally arcuately spaced rod gripping sockets 51 is mounted on the rod 10 through a central opening 52 of the same size as the rod. The connector element 50 is moved along the rod to a position in which the drive lugs 25, 26 of the outer drive member 17 are positioned within opposed openings 53 in the connector element. With this arrangement, the connector element may form part of a larger structural assembly, such as a fan, water wheel, large sprocket or the like, serving either as an output to the drive mechanism or as an input thereto, as desired.

The device of the present invention represents a uniquely simplified and elegant unidirectional drive device in which two drive elements are provided with fixed driving teeth engageable with each other during rotation of the input drive element in one direction, while the teeth simply slide relative to each other with non-driving contact when the input element is rotated in the opposite direction. Whereas typical unidirectional drive devices are provided on at least one of the primary elements thereof with driving teeth or the like that are movable, for example either by flexing or by pivoting relative to the body of the driving element. The present invention provides for driving teeth that are fixed on both of the primary elements, and provides for lateral movement of at least one of the driving elements to accommodate both engagement and disengagement of the fixed teeth for unidirectional driving. This arrangement is both economical and simplified to such an extent as to be suitable for a multi-part toy construction set. In this respect, the unidirectional drive comprises only two special parts, an inner drive element and an outer drive element, which are assembled with and cooperate with conventionally provided structural and connector elements of a standard K'NEX construction toy set.

It should be understood, of course, that the specific forms of the invention herein illustrated and described are intended to be representative only, as certain changes may be made therein without departing from the clear teachings of the disclosure. Accordingly, reference should be made to the following appended claims in determining the full scope of the invention.

I claim:

1. A unidirectional rotary drive mechanism for a multi-part construction toy having rod sections and connector elements, characterized by (a) first and second rod sections mounted for rotation about a common longitudinal axis, (b) a first rotary drive element mounted in surrounding relation to said first rod section for rotation about said axis, (c) a second drive element mounted in surrounding relation to said second rod section for rotation about said axis, (d) said first drive element being of generally circular form and having a plurality of outwardly directed, angularly oriented fixed drive teeth disposed about a circumference thereof, (e) said second drive element having a generally circular wall positioned in closely surrounding relation to said first drive element, (f) said wall having a plurality of inwardly directed, angularly oriented fixed drive teeth disposed thereabout and engageable with drive teeth of said first drive element, (g) at least one of said drive elements being freely movable in a direction radially of said axis, (h) said freely radially moveable drive element being drivingly interconnected to an associated rod section by a clip element secured to said associated rod section, (i) said freely radially moveable drive element and said clip element being drivingly interconnected by a projection extending from said clip element or said freely radially movable drive element, which projection is received within a recess in the other of said freely movable drive element or clip element, (j) said clip element being positioned to prevent axial displacement of said radially moveable drive element in a direction away from said other drive element, (k) when one of said drive elements is rotated in a first direction relative to another of said drive elements, said freely moveable drive element moves radially of said axis to cause the drive teeth of said drive elements to drivingly engage, (l) when said one drive element is rotated in a second direction, opposite to said first direction, the drive teeth of the respective drive elements do not drivingly engage.

2. A rotary drive mechanism according to claim 1, wherein (a) said first and second rod sections are portions of a common rod, and (b) said freely radially moveable drive element is drivingly connected to said rod and said other of said elements is freely rotatable on said rod.

3. A rotary drive mechanism according to claim 1, wherein (a) said freely radially movable drive element is formed with an elongated, eccentric opening therein, (b) one portion of said eccentric opening partially surrounding said rod with clearance space about said rod, (c) another portion of said eccentric opening partially surrounding said projection with clearance space about said projection, (d) whereby said freely radially movable drive element is free to move radially with respect to said rod while drivingly connected thereto.

4. A rotary drive mechanism according to claim 1, wherein (a) said first or second drive elements is provided with at least one axial projection, spaced radially from said axis, for driving engagement with an additional element, (b) said additional element being mounted for rotation on the rod section on which said last mentioned drive element is mounted.

5. A unidirectional rotary drive mechanism for a multi-part, plastic construction toy having a rod and connector elements, characterized by
   (a) said rod is mounted for rotation about a longitudinal axis thereof via the connector elements,
   (b) first and second rotary drive elements mounted in surrounding relation to said rod for rotation about said axis,
   (c) said first drive element being of generally circular form and having a plurality of outwardly directed, angularly oriented drive teeth disposed about a circumference thereof,
   (d) said second drive element having a generally circular wall positioned in closely surrounding relation to said first drive element,
   (e) said wall having a plurality of inwardly directed, angularly oriented drive teeth disposed thereabout and engageable with drive teeth of said first drive element,
   (f) said first drive element being drivingly connected to said rod and said second drive element being freely rotatable on said rod,
   (g) said first drive element being displaceable in a direction radially of said axis,
   (h) said first drive element is drivingly connected to said rod by a clip element, secured to said rod,
   (i) said clip element and said first drive element are drivingly interconnected by a projection extending from said clip element, which projection is received within a recess in the first drive element,
   (k) said projection and said recess being dimensioned to accommodate movement of said first drive element relative to the other in a radial direction with respect to said axis,
   (l) said clip element being positioned to prevent axial displacement of said first drive element in a direction away from said second drive element,
   (m) when said first drive element rotates relative to the second drive element in a first direction, said first drive element moves radially of said axis to cause said drive teeth of said first and second drive elements to drivingly engage, and
   (n) when said first drive element rotates in a second direction relative to said second drive element, opposite to said first direction, said drive teeth of the respective drive elements do not drivingly engage.

6. The unidirectional rotary drive mechanism of claim 5, wherein
   (a) said second drive element is provided with at least one axial projection, spaced radially from said axis, for driving engagement with an additional element, and
   (b) said additional element being mounted for rotation on the rod section.

7. A rotary drive mechanism according to claim 5 wherein
   (a) said first drive element is formed with an elongated, eccentric opening therein,
   (b) one portion of said eccentric opening partially surrounding said rod with a clearance space about said rod,
   (c) another portion of said eccentric opening partially surrounding said projection with a clearance space about said projection,
   (d) whereby said first drive element is free to move radially with respect to said rod while being drivingly connected thereto.

* * * * *